(12) United States Patent
Nariyasu et al.

(10) Patent No.: US 10,060,330 B2
(45) Date of Patent: Aug. 28, 2018

(54) ENGINE COOLANT CIRCUIT

(71) Applicant: YANMAR CO., LTD., Osaka-shi (JP)

(72) Inventors: Hiroki Nariyasu, Osaka (JP); Kenichi Fukuda, Osaka (JP); Ruriko Terada, Osaka (JP)

(73) Assignee: YANMAR CO., LTD., Osaka-shi (JP)

( * ) Notice: Subject to any disclaimer, the term of this patent is extended or adjusted under 35 U.S.C. 154(b) by 0 days.

(21) Appl. No.: 15/127,904

(22) PCT Filed: Feb. 13, 2015

(86) PCT No.: PCT/JP2015/053900
§ 371 (c)(1),
(2) Date: Sep. 21, 2016

(87) PCT Pub. No.: WO2015/146346
PCT Pub. Date: Oct. 1, 2015

(65) Prior Publication Data
US 2017/0107892 A1    Apr. 20, 2017

(30) Foreign Application Priority Data

Mar. 26, 2014    (JP) .................................. 2014-063051

(51) Int. Cl.
*F01P 7/16* (2006.01)
*F01P 3/20* (2006.01)
(Continued)

(52) U.S. Cl.
CPC .................... *F01P 7/16* (2013.01); *F01P 3/20* (2013.01); *F01P 2007/146* (2013.01);
(Continued)

(58) Field of Classification Search
CPC ........ F01P 7/165; F01P 7/16; F01P 2007/168; F01P 7/00
See application file for complete search history.

(56) References Cited

U.S. PATENT DOCUMENTS

| 4,964,371 A * | 10/1990 | Maeda .................... F01P 7/167 |
| | | 123/41.1 |
| 6,993,923 B2 * | 2/2006 | Beers ......................... B63J 2/04 |
| | | 322/7 |

(Continued)

FOREIGN PATENT DOCUMENTS

| CN | 101809260 A | 8/2010 |
| JP | 05-157006 A | 6/1993 |

(Continued)

OTHER PUBLICATIONS

International Search Report dated May 12, 2015, issued for PCT/JP2015/053900.

*Primary Examiner* — Long T Tran
(74) *Attorney, Agent, or Firm* — Locke Lord LLP

(57) ABSTRACT

An engine coolant circuit circulating coolant to cool an engine includes: a plurality of thermostatic switching valves disposed in parallel in passages leading from a coolant outlet of the engine; electrically driven three-way valves disposed downstream from the respective thermostatic switching valves in terms of a circulating direction of the coolant; and a radiator and an engine waste heat recovery device disposed in parallel in passages leading from coolant outlets of the electrically driven three-way valves, each one of the electrically driven three-way valves being provided with two coolant outlets, having one of the two coolant outlets thereof configured to communicate with the radiator, and having another one of the two coolant outlets thereof configured to communicate with the engine waste heat recovery device.

1 Claim, 3 Drawing Sheets

(51) Int. Cl.
*F02G 5/04* (2006.01)
*F01P 7/14* (2006.01)

(52) U.S. Cl.
CPC ..... *F01P 2060/16* (2013.01); *F01P 2060/185* (2013.01); *F02G 5/04* (2013.01); *F02G 2260/00* (2013.01)

(56) References Cited

U.S. PATENT DOCUMENTS

| | | | | |
|---|---|---|---|---|
| 8,333,068 | B2* | 12/2012 | Muramatsu | F01N 3/0205 60/320 |
| 2009/0114171 | A1* | 5/2009 | Hayashi | F01P 3/02 123/41.44 |
| 2010/0205946 | A1* | 8/2010 | Fukudome | F01N 3/2889 60/298 |
| 2011/0061833 | A1* | 3/2011 | Kihara | F01P 11/0285 165/51 |
| 2012/0011869 | A1* | 1/2012 | Kondo | B60H 1/2225 62/176.5 |
| 2013/0186088 | A1* | 7/2013 | Glover | F02G 5/04 60/616 |
| 2014/0083084 | A1* | 3/2014 | Fukuda | F02D 41/024 60/284 |
| 2014/0165562 | A1* | 6/2014 | Nagai | F01P 7/165 60/615 |
| 2014/0298838 | A1* | 10/2014 | Morishita | B60H 1/321 62/151 |

FOREIGN PATENT DOCUMENTS

| | | |
|---|---|---|
| JP | 09-096471 A | 4/1997 |
| JP | 2001-065348 A | 3/2001 |
| JP | 2009-092016 A | 4/2009 |
| JP | 2009-156162 A | 7/2009 |
| JP | 2012-107573 A | 6/2012 |
| WO | 2009/048090 A1 | 4/2009 |

* cited by examiner

ENGINE COOLANT CIRCUIT

TECHNICAL FIELD

The present invention relates to engine coolant circuits circulating coolant in order to cool an engine.

BACKGROUND ART

As an engine coolant circuit circulating coolant to cool an engine, for example, Patent Document 1 discloses an engine coolant circuit in which the coolant flows out of the engine and discharges waste heat thereof in a radiator before returning to the engine.

To increase the amount (capacitance) of the coolant in such an engine coolant circuit, typically, a coolant tube is increased in diameter or a component of the engine coolant circuit, such as a thermostatic switching valve, is increased in size.

CITATION LIST

Patent Document

Patent Document 1: JP 09-096471 A

SUMMARY OF INVENTION

Technical Problem

However, if the tube diameter of a coolant tube or the size of an engine coolant circuit component is to be increased in conventional engine coolant circuits, the unit prices of individual components generally grow.

Accordingly, it is an object of the present invention to provide an arrangement capable of increasing the amount of coolant in an engine coolant circuit without having to increase the diameter of a coolant tube or the size of a component of the engine coolant circuit, such as a thermostatic switching valve.

Solution to Problem

The present invention, to achieve the object, provides an engine coolant circuit circulating coolant to cool an engine, the engine coolant circuit including: a plurality of thermostatic switching valves disposed in parallel in passages leading from a coolant outlet of the engine; electrically driven three-way valves disposed downstream from the respective thermostatic switching valves in terms of a circulating direction of the coolant; and a radiator and an engine waste heat recovery device disposed in parallel in passages leading from coolant outlets of the electrically driven three-way valves, each one of the electrically driven three-way valves being provided with two coolant outlets, the electrically driven three-way valves having corresponding two of the coolant outlets thereof configured to communicate with the radiator in parallel so that the coolant flowing out of the electrically driven three-way valves merges and flows into the radiator and having other corresponding two of the coolant outlets thereof configured to communicate with the engine waste heat recovery device in parallel so that the coolant flowing out of the electrically driven three-way valves merges and flows into the engine waste heat recovery device.

Advantageous Effects of Invention

According to the present invention, it becomes possible to increase the amount of coolant in an engine coolant circuit without having to increase the diameter of a coolant tube or the size of a component of the engine coolant circuit, such as a thermostatic switching valve.

DESCRIPTION OF EMBODIMENTS

The following will describe an embodiment of the present invention in reference to attached drawings.

Figure 1:
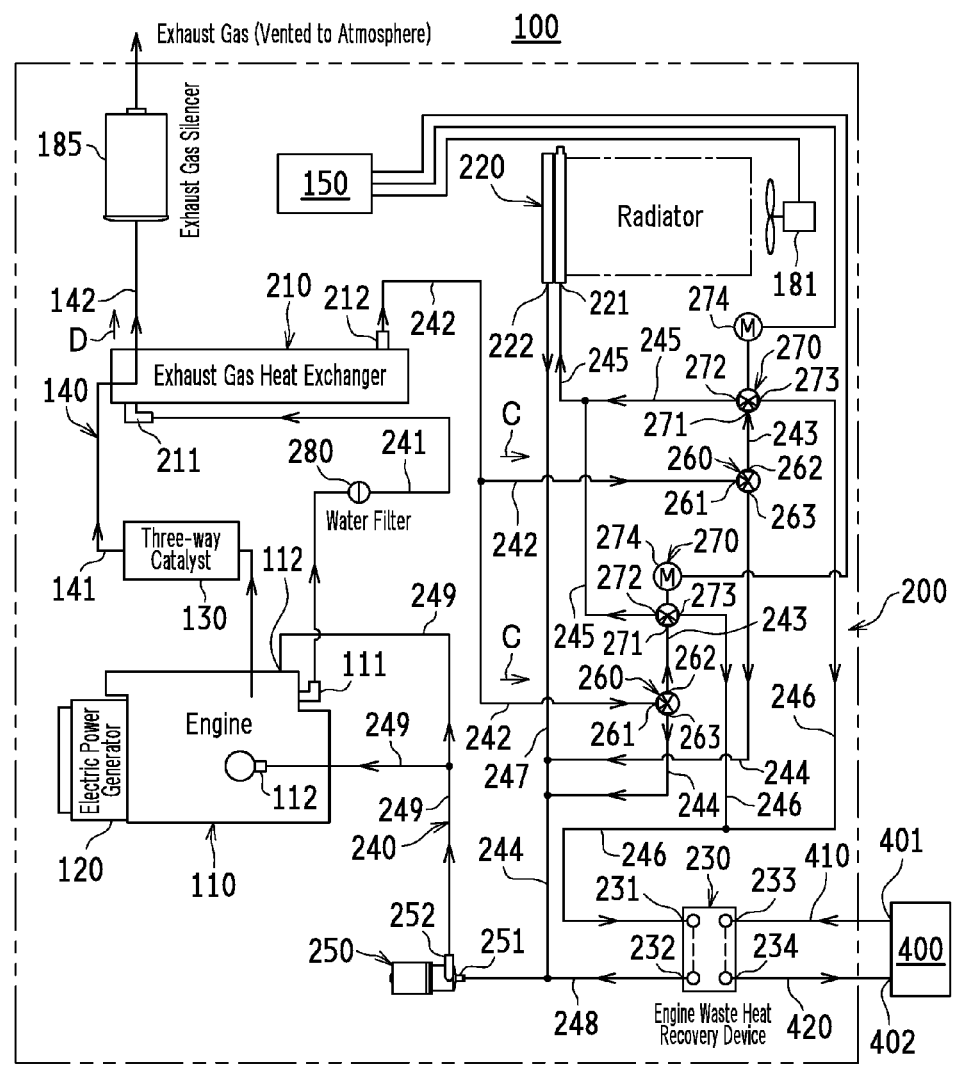
FIG. 1 is a schematic block diagram of an arrangement of a cogeneration apparatus including an engine coolant circuit in accordance with an embodiment of the present invention.
Figure 2:
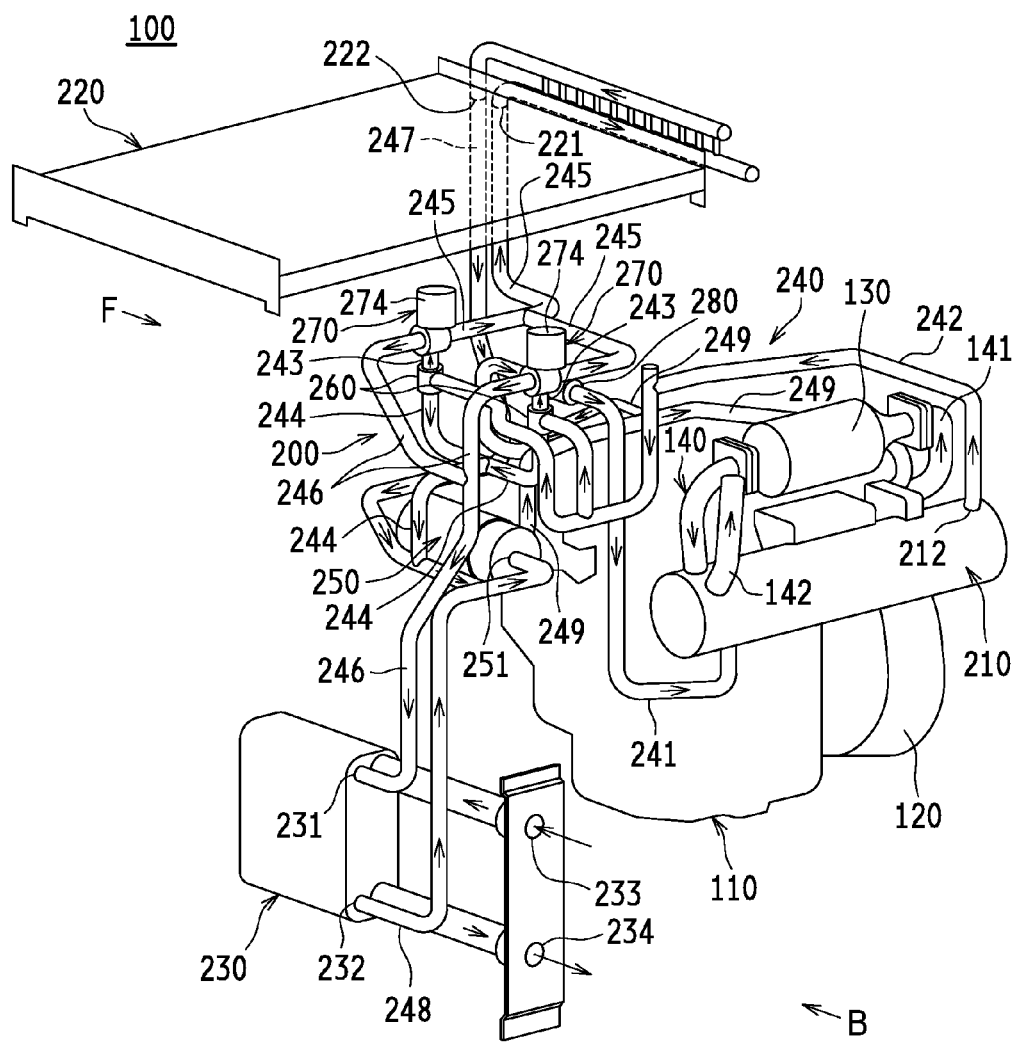
FIG. 2 is a rear perspective view of the engine coolant circuit and peripherals thereof in the cogeneration apparatus shown in FIG. 1 as viewed obliquely from the upper left.
Figure 3:
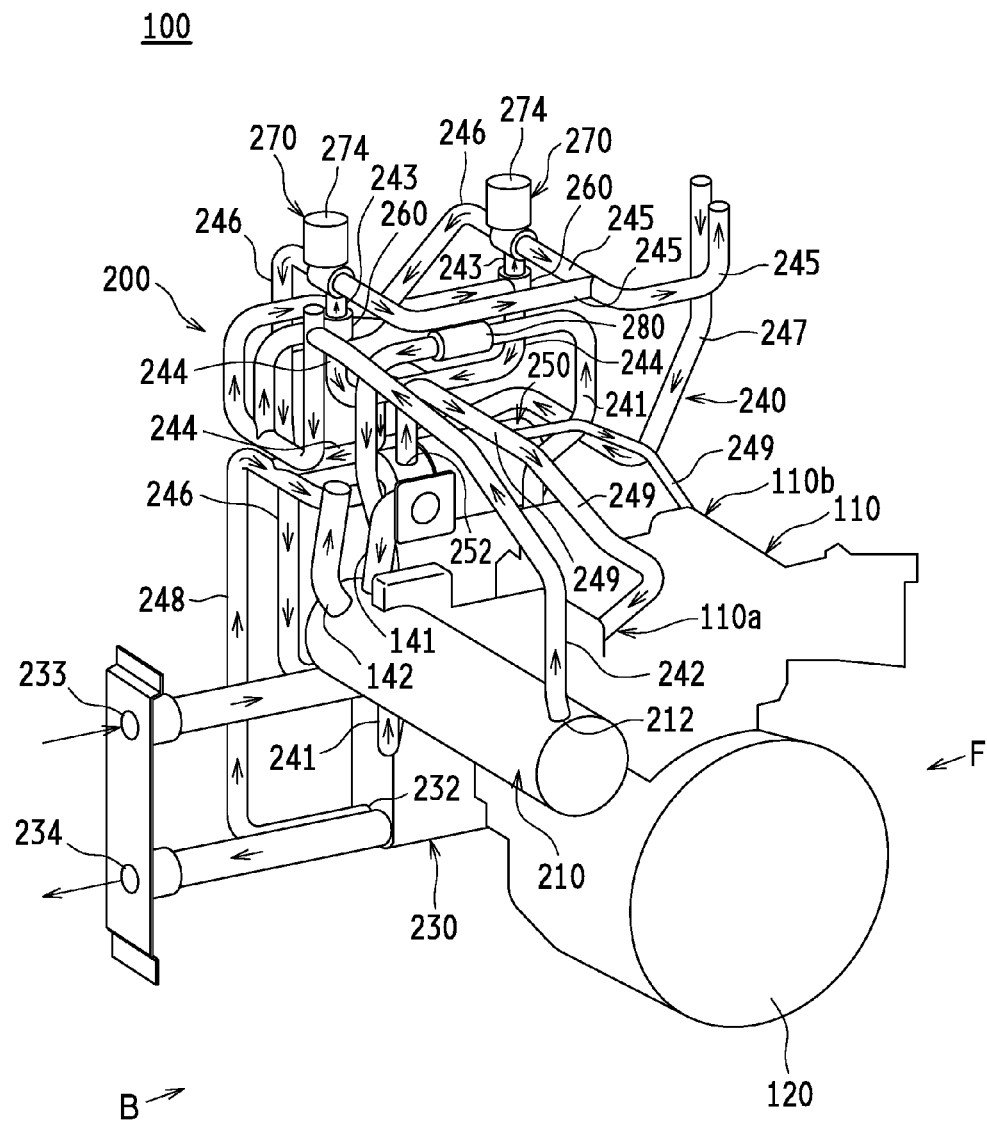
FIG. 3 is a rear perspective view of the engine coolant circuit and peripherals thereof in the cogeneration apparatus shown in FIG. 1 as viewed obliquely from the upper right.

FIG. 1 is a schematic block diagram of an arrangement of a cogeneration apparatus 100 including an engine coolant circuit 200 in accordance with the present embodiment. FIG. 2 is a perspective view of the engine coolant circuit 200 and peripherals thereof in the cogeneration apparatus 100 shown in FIG. 1 as viewed obliquely from the upper left on a backside B. FIG. 3 is a perspective view of the engine coolant circuit 200 and peripherals thereof in the cogeneration apparatus 100 shown in FIG. 1 as viewed obliquely from the upper right on the backside B. In FIGS. 2 and 3, a front side is indicated by F. FIG. 2 does not show an exhaust gas silencer 185 and some other members. FIG. 3 does not show the exhaust gas silencer 185, a radiator 220, a three-way catalyst 130, and some other members.

The present embodiment will describe an arrangement in accordance with the present invention as the arrangement is applied to the cogeneration apparatus 100. The cogeneration apparatus 100 is a system that electrically connects a commercial electric power system for external commercial power supplies and an electric power generation system for an electric power generator 120 to a power transmission system for electric power consuming apparatuses (loads) to meet the electric power demand of the loads and that also recovers waste heat generated as a result of electric power generation to utilize the recovered waste heat. In other words, the cogeneration apparatus 100, including an engine 110, the electric power generator 120, the engine coolant circuit 200, and an engine waste heat recovery device 230, has a capability to recover, using the engine waste heat recovery device 230, the waste heat of coolant circulated by the engine coolant circuit 200 and heated in heat exchange with the waste heat of the engine 110 (in this example, a capability to recover the waste heat of coolant and utilize the recovered waste heat for hot water supply), as well as an electric power generating capability to output the electric power generated by the electric power generator 120 driven by the engine 110.

As illustrated in FIGS. 1 to 3, the engine coolant circuit 200 includes an exhaust gas heat exchanger 210, the radiator 220, the engine waste heat recovery device 230, coolant passages 240, and a coolant pump 250. The exhaust gas heat exchanger 210 exchanges heat between the exhaust gas discharged from the engine 110 and the coolant flowing out of the engine 110. The radiator 220 (not shown in FIG. 3) dissipates the waste heat of the coolant flowing out of the exhaust gas heat exchanger 210. The engine waste heat recovery device 230 recovers the waste heat of the coolant flowing out of the exhaust gas heat exchanger 210. The coolant passages 240 (specifically, coolant tubes) distribute the coolant to the engine 110, the exhaust gas heat exchanger 210, the radiator 220, and the engine waste heat recovery device 230. The coolant pump 250 circulates the coolant to the engine 110, the exhaust gas heat exchanger 210, the radiator 220, and the engine waste heat recovery device 230 via the coolant passages 240. The engine waste heat recovery device 230 in this example is a water-to-water heat exchanger that exchanges heat between the coolant and hot-water-supply water for a hot water supply device 400 (see FIG. 1).

The engine coolant circuit 200 forms a circuit extending from the engine 110, running through the exhaust gas heat exchanger 210 and through the radiator 220 and/or the engine waste heat recovery device 230, reaching a suction portion 251 of the coolant pump 250 (see FIGS. 1 and 2), and circulating the coolant back to the engine 110.

Specifically, the engine coolant circuit 200 includes a plurality of thermostatic switching valves 260, 260 (two thermostatic switching valves 260, 260 in this example), electrically driven three-way valves 270, 270, the radiator 220, and the engine waste heat recovery device 230. The two thermostatic switching valves 260, 260 are disposed in parallel in passages leading from a coolant outlet 111 of the engine 110 (see FIG. 1). The electrically driven three-way valves 270, 270 (specifically, motor-driven valves) are disposed downstream from the respective thermostatic switching valves 260, 260 in terms of a circulating direction C of the coolant (see FIG. 1). The radiator 220 and the engine waste heat recovery device 230 are disposed in parallel in passages leading from coolant outlets (272, 273), (272, 273) of the electrically driven three-way valves 270, 270 (see FIG. 1). One of the two coolant outlets 272, 273 (i.e., the coolant outlet 272) of each electrically driven three-way valve 270 communicates with the radiator 220, and the other coolant outlet 273 communicates with the engine waste heat recovery device 230.

More specifically, the engine coolant circuit 200 further includes the multiple (two in this example) thermostatic switching valves 260, 260 and the multiple (two in this example) electrically driven three-way valves 270, 270.

The thermostatic switching valves 260 and the electrically driven three-way valves 270 used here are of the same types as those used conventionally and therefore of the same sizes as conventional thermostatic switching valves and electrically driven three-way valves.

Each thermostatic switching valve 260 is provided with a single coolant inlet 261 where the coolant flows in (see FIG. 1) and two coolant outlets 262, 263 where the coolant from the coolant inlet 261 flows out (see FIG. 1). The thermostatic switching valve 260 is arranged to operate so that if the coolant has a temperature higher than a predetermined temperature, the coolant flows from the coolant inlet 261 to one of the coolant outlets (i.e., the coolant outlet 262) and that if the coolant has a temperature lower than or equal to the predetermined temperature, the coolant flows from the coolant inlet 261 to the other coolant outlet 263.

Each electrically driven three-way valve 270 is provided with: a single coolant inlet 271 where the coolant flows in (see FIG. 1); the two coolant outlets 272, 273 where the coolant from the coolant inlet 271 divides and flows out (see FIG. 1); an actuator valve (not shown) that changes a flow rate ratio of a first flow rate of the coolant flowing from the coolant inlet 271 to one of the coolant outlets (i.e., the coolant outlet 272) and a second flow rate of the coolant flowing from the coolant inlet 271 to the other coolant outlet 273; and a drive section 274 (specifically, a drive motor) that drives the actuator valve. The drive section 274 is electrically connected to an output system of a control device 150 (see FIG. 1) and arranged to drive the actuator valve based on instruction signals from the control device 150 so as to change the flow rate ratio of the first flow rate and the second flow rate.

The coolant passages 240 include a first coolant passage 241, a second coolant passage 242, third coolant passages 243, a fourth coolant passage 244, a fifth coolant passage 245, a sixth coolant passage 246, a seventh coolant passage 247, an eighth coolant passage 248, and a ninth coolant passage 249.

The first coolant passage 241 is disposed between the engine 110 and the exhaust gas heat exchanger 210. The first coolant passage 241 has an upstream end thereof communicating with the coolant outlet 111 of the engine 110 (see FIG. 1) and a downstream end thereof communicating with a coolant inlet 211 of the exhaust gas heat exchanger 210 (see FIG. 1).

The second coolant passage 242 is disposed between the exhaust gas heat exchanger 210 and the thermostatic switching valves 260, 260. The second coolant passage 242 has an upstream end thereof communicating with a coolant outlet 212 of the exhaust gas heat exchanger 210. The second coolant passage 242, dividing into a plurality of branch passages (two branch passages in this example) toward the downstream, has the downstream ends thereof communicating respectively with the coolant inlets 261, 261 of the thermostatic switching valves 260, 260. In the example shown in FIG. 1, the upper one of the branch passages of the second coolant passage 242 communicates with the upper one of the thermostatic switching valves 260, 260, whereas the lower one of the branch passages of the second coolant passage 242 communicates with the lower one of the thermostatic switching valves 260, 260.

The multiple (two in this example) third coolant passages 243 are disposed respectively between the thermostatic switching valves 260, 260 and the electrically driven three-way valves 270, 270. Each third coolant passage 243 has an upstream end thereof communicating with the coolant outlet 262 of an associated one of the thermostatic switching valves 260 and a downstream end thereof communicating with the coolant inlet 271 of an associated one of the electrically driven three-way valves 270. In the example shown in FIG. 1, the upper one of the third coolant passages 243, 243 communicates with the upper thermostatic switching valve 260 and the upper electrically driven three-way valve 270, and the lower one of the third coolant passages 243, 243 communicates with the lower thermostatic switching valve 260 and the lower electrically driven three-way valve 270.

The fourth coolant passage 244 is disposed between the thermostatic switching valves 260, 260 and the coolant pump 250. The fourth coolant passage 244, dividing into a plurality of branch passages (two branch passages in this example) toward the upstream, has the upstream ends thereof communicating respectively with the coolant outlets 263, 263 of the thermostatic switching valves 260, 260 and a downstream end thereof communicating with the suction portion 251 of the coolant pump 250. In the example shown in FIG. 1, the upper one of the branch passages of the fourth coolant passage 244 communicates with the upper thermostatic switching valve 260, and the lower one of the branch passages of the fourth coolant passage 244 communicates with the lower thermostatic switching valve 260.

The fifth coolant passage 245 is disposed between the electrically driven three-way valves 270, 270 and the radiator 220. The fifth coolant passage 245, dividing into a plurality of branch passages (two branch passages in this example) toward the upstream, has the upstream ends thereof communicating respectively with the coolant outlets 272, 272 of the electrically driven three-way valves 270, 270 and a downstream end thereof communicating with a coolant inlet 221 of the radiator 220 (see FIGS. 1 and 2). In the example shown in FIG. 1, the upper one of the branch passages of the fifth coolant passage 245 communicates with the upper electrically driven three-way valve 270, and the lower one of the branch passages of the fifth coolant passage 245 communicates with the lower electrically driven three-way valve 270.

The sixth coolant passage 246 is disposed between the electrically driven three-way valves 270, 270 and the engine waste heat recovery device 230. The sixth coolant passage 246, dividing into a plurality of branch passages (two branch passages in this example) toward the upstream, has the upstream ends thereof communicating respectively with the coolant outlets 273, 273 of the electrically driven three-way valves 270, 270 and a downstream end thereof communicating with a coolant inlet 231 of the engine waste heat recovery device 230 (see FIGS. 1 and 2). In the example shown in FIG. 1, the upper one of the branch passages of the sixth coolant passage 246 communicates with the upper electrically driven three-way valve 270, and the lower one of the branch passages of the sixth coolant passage 246 communicates with the lower electrically driven three-way valve 270.

The seventh coolant passage 247 is disposed between the radiator 220 and the coolant pump 250. The seventh coolant passage 247 has an upstream end thereof communicating with a coolant outlet 222 of the radiator 220 (see FIGS. 1 and 2) and a downstream end thereof communicating with the suction portion 251 of the coolant pump 250.

The eighth coolant passage 248 is disposed between the engine waste heat recovery device 230 and the coolant pump 250. The eighth coolant passage 248 has an upstream end thereof communicating with a coolant outlet 232 of the engine waste heat recovery device 230 and a downstream end thereof communicating with the suction portion 251 of the coolant pump 250.

The ninth coolant passage 249 is disposed between the coolant pump 250 and the engine 110. The ninth coolant passage 249 has an upstream end thereof communicating with a discharge portion 252 of the coolant pump 250 (see FIGS. 1 and 3) and downstream ends thereof communicating with coolant inlets 112 of the engine 110 (see FIG. 1). In this example, the ninth coolant passage 249, dividing into two branch passages toward the downstream, has one of the downstream ends thereof communicating with one of the coolant inlets 112 (see FIG. 1) located on a cylinder head side 110a of the engine 110 (see FIG. 3) and the other downstream end thereof communicating with the other coolant inlet 112 (see FIG. 1) located on a cylinder block side 110b of the engine 110 (see FIG. 3).

The first to ninth coolant passages 249 to 241 are of the same types as those used conventionally and have the same tube diameters (including the branch passages of the second coolant passage 242, the branch passages of the fourth coolant passage 244, the branch passages of the fifth coolant passage 245, and the branch passages of the sixth coolant passage 246).

The engine waste heat recovery device 230 is provided, on a heat recovery portion thereof (a portion communicating with the hot water supply device 400 in this example), with an inlet 233 and an outlet 234 where a heat medium (hot-water-supply water in this example) flows in and out respectively. Specifically, the inlet 233 of the engine waste heat recovery device 230 communicates with an outlet 401 (see FIG. 1) of the hot water supply device 400 via an inflow passage 410 (see FIG. 1), and the outlet 234 of the engine waste heat recovery device 230 communicates with an inlet 402 (see FIG. 1) of the hot water supply device 400 via an outflow passage 420 (see FIG. 1).

In the present embodiment, the cogeneration apparatus 100 further includes a water filter 280 that filters the coolant to remove foreign objects from the coolant.

The water filter 280 is interposed in a coolant passage between the engine 110 and the exhaust gas heat exchanger 210 (specifically, in the first coolant passage 241).

The cogeneration apparatus 100 further includes an exhaust gas passage 140 (specifically, an exhaust gas tube) for discharging the exhaust gas of the engine 110 to the outside via the exhaust gas heat exchanger 210 (see FIGS. 1 and 2).

The exhaust gas passage 140 includes a first exhaust gas passage 141 and a second exhaust gas passage 142. The first exhaust gas passage 141 is disposed upstream from the exhaust gas heat exchanger 210 (specifically, between the engine 110 and the exhaust gas heat exchanger 210) in terms of an exhaust gas venting direction D for the exhaust gas (see FIG. 1). The second exhaust gas passage 142 is disposed downstream from the exhaust gas heat exchanger 210 (specifically, between the exhaust gas heat exchanger 210 and the outside).

In the present embodiment, the cogeneration apparatus 100 further includes the three-way catalyst 130 (see FIGS. 1 and 2) that purifies the exhaust gas discharged from the engine 110 and the exhaust gas silencer 185 (see FIG. 1) that reduces exhaust gas sound made when the exhaust gas from the engine 110 is discharged to the outside.

The three-way catalyst 130 and the exhaust gas silencer 185 are disposed respectively in the first exhaust gas passage 141 and in the second exhaust gas passage 142.

In the present embodiment, the engine coolant circuit 200 further includes a radiator fan 181 (see FIG. 1) that is driven under the control of the control device 150 to discharge air in the exhaust gas chamber to the outside to allow the radiator 220 to dissipate heat.

In the engine coolant circuit 200 described above, the exhaust gas discharged from the engine 110 passes through the first exhaust gas passage 141 and is purified by the three-way catalyst 130 before entering the exhaust gas heat exchanger 210. Meanwhile, the coolant flowing out of the coolant outlet 111 after cooling the engine 110 passes through the first coolant passage 241 and is filtered by the water filter 280 to remove foreign objects from the coolant, before flowing into the coolant inlet 221 of the exhaust gas heat exchanger 210.

The exhaust gas heat exchanger 210 exchanges heat between the exhaust gas discharged from the three-way catalyst 130 and the coolant flowing out of the water filter 280.

The coolant flowing out of the coolant outlet 212 of the exhaust gas heat exchanger 210 divides into two branch streams while passing through the second coolant passage 242 and flows into the coolant inlet 261 of each thermostatic switching valve 260. If the coolant (one of the branch streams thereof), upon flowing into the coolant inlet 261, has a temperature lower than or equal to the predetermined temperature, the thermostatic switching valve 260 operates so that the coolant can flow out of the coolant outlet 263, and the coolant thus flows out of the coolant outlet 263 and merges with the other branch stream of the coolant while passing through the fourth coolant passage 244, before being sucked into the suction portion 251 of the coolant pump 250. On the other hand, if the coolant has a temperature higher than the predetermined temperature, the thermostatic switching valve 260 operates so that the coolant can flow out of the coolant outlet 262, and the coolant thus flows out of the coolant outlet 262, passes through the third coolant passage 243, and flows into the coolant inlet 271 of the electrically driven three-way valve 270.

In each electrically driven three-way valve 270, the control device 150 drives the drive section 274 in accordance with, for example, the temperature of the coolant detected by a temperature sensor (not shown) and the usage of the heat recovery portion (the portion communicating with the hot water supply device 400 in this example), so that the actuator valve changes the flow rate ratio, which regulates the first flow rate of the coolant flowing from the coolant inlet 271 to one of the coolant outlets (i.e., the coolant outlet 272) (the coolant outlet communicating with the radiator 220) and the second flow rate of the coolant flowing from the coolant inlet 271 to the other coolant outlet 273 (the coolant outlet communicating with the engine waste heat recovery device 230). For example, when the engine waste heat recovery device 230 exchanges little heat, the control device 150 increases the first flow rate (i.e., decreases the second water amount) to increase the amount of water flowing to the radiator 220.

The coolant (both branch streams of the coolant) flowing out of the coolant outlets 272, 272 of the electrically driven three-way valves 270, 270 merges while passing through the fifth coolant passage 245, before flowing into the coolant inlet 221 of the radiator 220. The radiator 220 dissipates the waste heat of the coolant flowing in from the exhaust gas heat exchanger 210 via the thermostatic switching valves 260, 260 and the electrically driven three-way valves 270, 270. The waste heat is discharged to the outside from the radiator 220 using the radiator fan 181. The coolant flowing out of the coolant outlet 222 of the radiator 220 passes through the seventh coolant passage 247 and is sucked into the suction portion 251 of the coolant pump 250.

The coolant flowing out of the coolant outlets 273, 273 of the electrically driven three-way valves 270, 270 merges while passing through the sixth coolant passage 246, before flowing into the coolant inlet 231 of the engine waste heat recovery device 230. The engine waste heat recovery device 230 recovers the waste heat of the coolant flowing in from the exhaust gas heat exchanger 210 via the thermostatic switching valves 260, 260 and the electrically driven three-way valves 270, 270. The waste heat recovered by the engine waste heat recovery device 230 is used in the heat recovery portion (the portion communicating with the hot water supply device 400 in this example). The coolant flowing out of the coolant outlet 232 of the engine waste heat recovery device 230 passes through the eighth coolant passage 248 and is sucked into the suction portion 251 of the coolant pump 250.

The coolant discharged from the discharge portion 252 of the coolant pump 250 divides into two branch streams while passing through the ninth coolant passage 249. One of the branch streams of the coolant flows into the coolant inlet 261 on the cylinder head side 110*a* of the engine 110, whereas the other branch stream of the coolant flows into the coolant inlet 261 on the cylinder block side 110*b* of the engine 110.

It should be noted that the present example includes the two thermostatic switching valves 260, the two electrically driven three-way valves 270, and the two third coolant passages 243. Alternatively, three or more of each of these valves and passages may be provided. When this is the case, the second coolant passage 242, the fourth coolant passage 244, the fifth coolant passage 245, and the sixth coolant passage 246 each divide into three or more branch passages.

In this manner, the engine coolant circuit 200 is capable of cooling the engine 110 and the exhaust gas by circulating the coolant.

As described above, according to the present embodiment, the multiple (two in this example) thermostatic switching valves 260, 260 are disposed in parallel with each other in passages leading from the coolant outlet 111 of the engine 110, the electrically driven three-way valves 270, 270 are disposed downstream from the respective thermostatic switching valves 260, 260 in terms of the circulating direction C of the coolant, and the radiator 220 and the engine waste heat recovery device 230 are disposed in parallel with each other in passages leading from the coolant outlets (272, 273), (272, 273) of the electrically driven three-way valves 270, 270. In addition, each one of the electrically driven three-way valves 270, 270 has one of the two coolant outlets 272, 273 thereof (i.e., the coolant outlet 272) configured to communicate with the radiator 220 and has the other coolant outlet 273 thereof configured to communicate with the engine waste heat recovery device 230. Therefore, the amount (capacitance) of the coolant in the engine coolant circuit 200 can be increased by as much as the additional amount made available by the parallel arrangement of the multiple thermostatic switching valves 260 and the multiple electrically driven three-way valves 270, without having to increase the diameter of coolant tubes (i.e., the coolant passages 240) or the size of the thermostatic switching valves 260 and the electrically driven three-way valves 270. Therefore, the amount (capacitance) of the coolant in the engine coolant circuit 200 can be increased without having to increase the diameter of coolant tubes or the size of components of the engine coolant circuit 200, such as the thermostatic switching valves 260. Besides, the amount of the coolant in the engine coolant circuit 200 can be increased while restricting the cost of the components of the thermostatic switching valves 260 and the electrically driven three-way valves 270, by using the multiple thermostatic switching valves 260 and the multiple electrically driven three-way valves 270 of conventional size as the thermostatic switching valves 260 and the electrically driven three-way valves 270. Additionally, a purchase quantity can be ensured for the thermostatic switching valves 260 and the electrically driven three-way valves 270, which enables the unit prices of the components to be reduced. For example, shared use of many common components in different models can reduce the unit prices of the components.

The present invention is not limited to the description of the embodiments and examples described above and may be implemented in various other forms. Therefore, the embodiments and examples are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

The present application hereby claims priority on Patent Application No. 2014-063051 filed in Japan on Mar. 26, 2014, the entire contents of which are hereby incorporated herein by reference.

INDUSTRIAL APPLICABILITY

The present invention relates to engine coolant circuits circulating coolant in order to cool an engine. The present invention is applicable, in particular, for the purpose of increasing the amount of coolant in an engine coolant circuit without having to increase the diameter of a coolant tube or the size of a component of the engine coolant circuit, such as a thermostatic switching valve.

REFERENCE SIGNS LIST

100 Cogeneration Apparatus
110 Engine
110a Cylinder Head Side
110b Cylinder Block Side
111 Coolant Outlet
112 Coolant Inlet
120 Electric Power Generator
130 Three-way Catalyst
140 Exhaust Gas Passage
141 First Exhaust Gas Passage
142 Second Exhaust Gas Passage
150 Control Device
181 Radiator Fan
185 Exhaust Gas Silencer
200 Engine Coolant Circuit
210 Exhaust Gas Heat Exchanger
211 Coolant Inlet
212 Coolant Outlet
220 Radiator
221 Coolant Inlet
222 Coolant Outlet
230 Engine Waste Heat Recovery Device
231 Coolant Inlet
232 Coolant Outlet
233 Inlet
234 Outlet
240 Coolant Passage
250 Coolant Pump
251 Suction Portion
252 Discharge Portion
260 Thermostatic Switching Valve
261 Coolant Inlet
262 Coolant Outlet
263 Coolant Outlet
270 Electrically driven Three-way Valve
271 Coolant Inlet
272 Coolant Outlet
273 Coolant Outlet
274 Drive Section
280 Water Filter
400 Hot Water Supply Device
401 Outlet
402 Inlet
410 Inflow Passage
420 Outflow Passage
B Backside
C Circulating Direction
D Exhaust Gas Venting Direction
F Front Side

The invention claimed is:

1. An engine coolant circuit circulating coolant to cool an engine, the engine coolant circuit comprising:
a plurality of thermostatic switching valves disposed in parallel in passages leading from a coolant outlet of the engine;
a respective electrically driven three-way valves disposed downstream from a respective thermostatic switching valve in a circulating direction of the coolant;
a radiator; and an engine waste heat recovery device, the radiator and the engine waste heat recovery device being disposed in respective parallel passages leading from coolant outlets of the electrically driven three-way valves,
each one of the electrically driven three-way valves being provided with two coolant outlets, each one of the electrically driven three-way valves having a first coolant outlet of the two coolant outlets thereof configured to communicate with the radiator in parallel so that the coolant flowing out of the electrically driven three-way valves merges and flows into the radiator and having a second coolant outlet of the two coolant outlets thereof configured to communicate with the engine waste heat recovery device in parallel so that the coolant flowing out of the electrically driven three-way valves merges and flows into the engine waste heat recovery device.

* * * * *